(12) United States Patent
Rao (10) Patent No.: US 11,886,729 B2
(45) Date of Patent: Jan. 30, 2024

(54) DATA STORAGE METHOD AND APPARATUS

(71) Applicant: Huawei Technologies Co., Ltd., Shenzhen (CN)

(72) Inventor: Zhi Rao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 17/720,479

(22) Filed: Apr. 14, 2022

(65) Prior Publication Data
US 2022/0236901 A1 Jul. 28, 2022

Related U.S. Application Data

(63) Continuation of application No. PCT/CN2020/121843, filed on Oct. 19, 2020.

(30) Foreign Application Priority Data

Oct. 17, 2019 (CN) .......................... 201910999337.0

(51) Int. Cl.
G06F 3/06 (2006.01)

(52) U.S. Cl.
CPC .......... *G06F 3/0641* (2013.01); *G06F 3/0604* (2013.01); *G06F 3/0647* (2013.01); *G06F 3/0659* (2013.01); *G06F 3/0673* (2013.01)

(58) Field of Classification Search
CPC .... G06F 3/0641; G06F 3/0604; G06F 3/0647; G06F 3/0659; G06F 3/0673
See application file for complete search history.

(56) References Cited

U.S. PATENT DOCUMENTS

| 10,346,297 | B1 | 7/2019 | Wallace |
| 2004/0167903 | A1* | 8/2004 | Margolus ............ G06F 16/2358 |
| 2004/0215637 | A1 | 10/2004 | Kitamura et al. |
| 2011/0131390 | A1 | 6/2011 | Srinivasan et al. |
| 2011/0167221 | A1 | 7/2011 | Pangal et al. |

FOREIGN PATENT DOCUMENTS

| CN | 103959259 A | 7/2014 |
| CN | 104462388 A | 3/2015 |
| CN | 104793901 A | 7/2015 |
| CN | 105786401 A | 7/2016 |
| CN | 109918018 A | 6/2019 |
| CN | 109947731 A | 6/2019 |
| WO | 2018058382 A1 | 4/2018 |

OTHER PUBLICATIONS

Zhichao Cao et al., "TDDFS: A Tier-Aware Data Deduplication-Based File System," ACM Transactions on Storage, vol. 15, No. 1, Feb. 2019, 26 pages.

* cited by examiner

*Primary Examiner* — Jae U Yu
(74) *Attorney, Agent, or Firm* — Conley Rose, P.C.

(57) ABSTRACT

A data storage method and apparatus includes receiving a data write request, where the data write request carries to-be-written data, and the to-be-written data includes at least one data block; calculating a fingerprint of each data block, where the fingerprint uniquely identifies the data block; determining whether the fingerprint of each data block exists in a fingerprint list, where the fingerprint list includes a fingerprint corresponding to a data block stored in a high-speed storage medium and a fingerprint corresponding to a data block stored in a low-speed storage medium; and performing a deduplication operation on the to-be-written data.

20 Claims, 9 Drawing Sheets

DATA STORAGE METHOD AND APPARATUS

CROSS-REFERENCE TO RELATED APPLICATIONS

This application is a continuation of International Patent Application No. PCT/CN2020/121843, filed on Oct. 19, 2020, which claims priority to Chinese Patent Application 201910999337.0, filed on Oct. 17, 2019. Both of the aforementioned applications are hereby incorporated by reference in their entireties.

TECHNICAL FIELD

This application relates to the storage field, and in particular, to a data storage method and apparatus.

BACKGROUND

Challenges to the field of storage technologies come from users' increasing capacity and performance requirements. As the data volume increases, storage devices need to be purchased continuously, increasing storage costs. In different phases of a data life cycle, there are different requirements on data performance. Therefore, data needs to be adjusted continuously. For example, in a production phase, data needs to be deployed on high-performance storage devices. In an archiving phase, the data needs to be migrated to low-performance and low-cost storage devices. How to simplify data management, improve storage performance, and reduce device costs are challenges to current storage technologies.

To improve storage performance, reduce costs, and simplify management, currently a hierarchical storage technology is widely used. A technology combining a high-performance solid-state drive (SSD) and a low-performance and large-capacity mechanical disk to form a hybrid storage pool is adopted, and hot data and cold data are respectively stored in the SSD and the mechanical disk by using a cold and hot data identification technology and a data migration technology. This is a solution that balances costs and performance. However, when the hierarchical storage technology is used, a data deduplication operation is separately performed in different storage media, and a deduplication effect is poor. As a result, a same data block may be stored in different storage media, causing a waste of storage spaces.

SUMMARY

Embodiments of this application provide a data storage method and apparatus. In solutions in embodiments of this application, a global fingerprint list can be generated in a storage array to perform deduplication on data, thereby improving a data deduplication effect and storage efficiency.

In a first aspect, an embodiment of this application provides a data storage method, applied to a storage array, where the storage array includes a high-speed storage medium and a low-speed storage medium, and the method includes receiving a data write request, where the data write request carries to-be-written data, and the to-be-written data includes at least one data block; calculating a fingerprint of each data block, where the fingerprint is used to uniquely identify the data block; determining whether the fingerprint of each data block exists in a fingerprint list, where the fingerprint list includes a fingerprint corresponding to a data block stored in the high-speed storage medium and a fingerprint corresponding to a data block stored in the low-speed storage medium; performing a deduplication operation on the to-be-written data, where the deduplication operation is to make a data block whose fingerprint exists in the fingerprint list to point to a storage address of the data block corresponding to the fingerprint in the fingerprint list, and delete the data block whose fingerprint exists in the fingerprint list from the to-be-written data; and storing the to-be-written data on which the deduplication operation has been performed into the high-speed storage medium or the low-speed storage medium.

In this embodiment of this application, a global fingerprint list is generated, so that data blocks stored in the high-speed storage medium and the low-speed storage medium share the same fingerprint list to perform a data deduplication operation, thereby avoiding repeatedly generating a fingerprint for a same data block in different storage media, avoiding repeatedly storing the data block in different storage media, and thus improving storage efficiency and saving a storage space.

In a feasible embodiment, the method further includes adding, to the fingerprint list, a fingerprint of a data block in the to-be-written data that does not exist in the fingerprint list; and after the to-be-written data on which the deduplication operation has been performed is stored into the high-speed storage medium or the low-speed storage medium, adding, to the fingerprint list, a storage address of the data block that is in the to-be-written data and whose fingerprint does not exist in the fingerprint list.

In a feasible embodiment, the method further includes, for the data block whose fingerprint exists in the fingerprint list, progressively increasing a heat count of the fingerprint of the data block based on a quantity of times of reading the data block; for a fingerprint whose heat count is greater than a first threshold, if a storage address of a data block corresponding to the fingerprint is the low-speed storage medium, migrating the data block corresponding to the fingerprint from the low-speed storage medium to the high-speed storage medium; and modifying an address corresponding to the fingerprint of the migrated data block in the fingerprint list to an address of the data block in the high-speed storage medium.

In a feasible embodiment, the method further includes, for a fingerprint whose heat count is less than a second threshold, if a storage address of a data block corresponding to the fingerprint is the high-speed storage medium, migrating the data block corresponding to the fingerprint from the high-speed storage medium to the low-speed storage medium; and modifying an address corresponding to the fingerprint of the migrated data block in the fingerprint list to an address of the data block in the low-speed storage medium.

In a feasible embodiment, the fingerprint list is stored in the high-speed storage medium.

In a second aspect, an embodiment of this application provides a storage apparatus, where the storage apparatus includes a high-speed storage medium and a low-speed storage medium, and includes a receiving unit configured to receive a data write request, where the data write request carries to-be-written data, and the to-be-written data includes at least one data block; a calculation unit configured to calculate a fingerprint of each data block, where the fingerprint is used to uniquely identify the data block; a determining unit configured to determine whether the fingerprint of each data block exists in a fingerprint list, where the fingerprint list includes a fingerprint corresponding to a data block stored in the high-speed storage medium and a fingerprint corresponding to a data block stored in the low-speed storage medium; a deduplication unit configured to perform a deduplication operation on the to-be-written data, where the deduplication operation is to make a data block whose fingerprint exists in the fingerprint list to point to a storage address of the data block corresponding to the fingerprint in the fingerprint list, and delete the data block whose fingerprint exists in the fingerprint list from the to-be-written data; and a storage unit configured to store the to-be-written data on which the deduplication operation has been performed into the high-speed storage medium or the low-speed storage medium.

In a feasible embodiment, the determining unit is further configured to add, to the fingerprint list, a fingerprint of a data block in the to-be-written data that does not exist in the fingerprint list; and after the to-be-written data on which the deduplication operation has been performed is stored into the high-speed storage medium or the low-speed storage medium, add, to the fingerprint list, a storage address of the data block that is in the to-be-written data and whose fingerprint does not exist in the fingerprint list.

In a feasible embodiment, the apparatus further includes a migration unit configured to, for the data block whose fingerprint exists in the fingerprint list, progressively increase a heat count of the fingerprint of the data block based on a quantity of times of reading the data block; for a fingerprint whose heat count is greater than a first threshold, if a storage address of a data block corresponding to the fingerprint is the low-speed storage medium, migrate the data block corresponding to the fingerprint from the low-speed storage medium to the high-speed storage medium; and modify an address corresponding to the fingerprint of the migrated data block in the fingerprint list to an address of the data block in the high-speed storage medium.

In a feasible embodiment, the migration unit is further configured to, for a fingerprint whose heat count is less than a second threshold, if a storage address of a data block corresponding to the fingerprint is the high-speed storage medium, migrate the data block corresponding to the fingerprint from the high-speed storage medium to the low-speed storage medium; and modify an address corresponding to the fingerprint of the migrated data block in the fingerprint list to an address of the data block in the low-speed storage medium.

In a feasible embodiment, the fingerprint list is stored in the high-speed storage medium.

In a third aspect, an embodiment of this application provides an apparatus, including a memory that stores execulist program code; a processor coupled to the memory, where the processor invokes the execulist program code stored in the memory, so that the apparatus performs any method of the first aspect.

Of a fourth aspect, an embodiment of this application provides a computer-readable storage medium, where the computer storage medium includes program instructions, and when the program instructions are run on a computer, the computer is enabled to perform any method of the first aspect.

These aspects or other aspects of this application are more concise and easier to understand in descriptions of the following embodiments.

BRIEF DESCRIPTION OF DRAWINGS

To describe the technical solutions in embodiments of this application more clearly, the following briefly describes the accompanying drawings for describing the embodiments. The accompanying drawings in the following description show some embodiments of this application, and a person of ordinary skill in the art may still derive other drawings from these accompanying drawings without creative efforts.

DESCRIPTION OF EMBODIMENTS

To make a person skilled in the art understand the technical solutions in this application better, the following describes the technical solutions in the embodiments of this application with reference to the accompanying drawings in the embodiments of this application.

Figure 1:
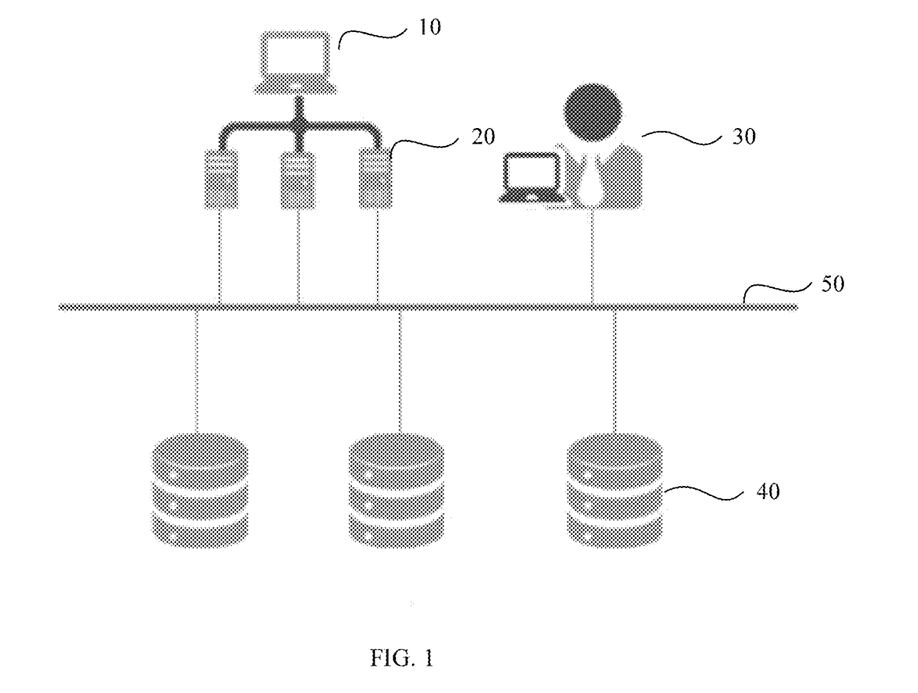
FIG. 1 is a schematic diagram of an information technology system of an embodiment of this application.

An application scenario of the embodiments of this application is an information technology (IT) system. FIG. 1 is a schematic diagram of an IT system of an embodiment of this application. The system includes a user terminal 10, an application server 20, a storage array 40, an administrator 30, and a network 50. The application server 20 may be a virtual server or a physical server, and is responsible for computing application data and storing the data into the storage array. The storage array 40 includes a medium such as a solid state disk, a conventional mechanical disk, or a tape library, and is configured to persistently store the application data. An access protocol between the storage array and the application server may be a protocol such as a Common Internet File System (CIFS), a Network File System (NFS), a Small Computer System Interface (iSCSI), or a Fiber Channel (FC).

Figure 2:
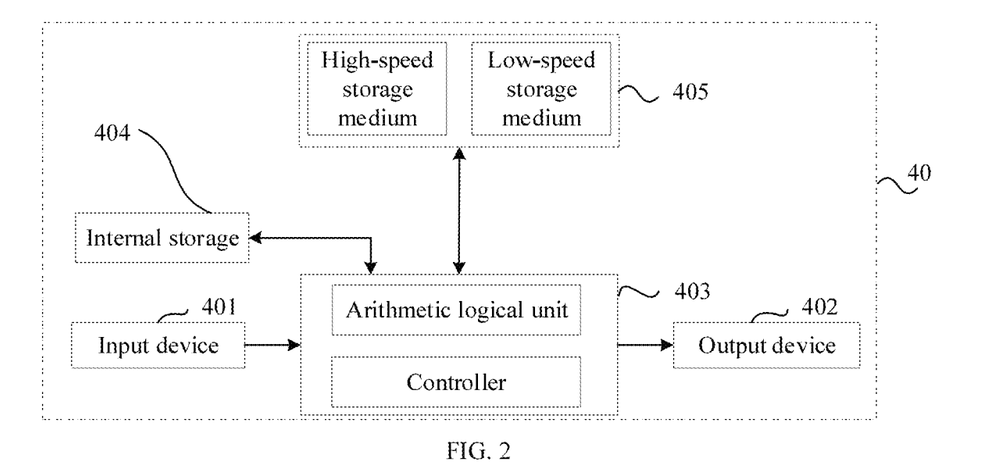
FIG. 2 is a schematic structural diagram of a storage array of an embodiment of this application.

FIG. 2 is a schematic structural diagram of a storage array 40 of an embodiment of this application. As shown in FIG. 2, the storage array 40 includes an input device 401, an output device 402, and a central processing unit (CPU) 403. The CPU 403 includes an arithmetic logical unit and a controller, and is connected to an internal storage 404 and an external storage 405, where the external storage 405 includes a high-speed storage medium and a low-speed storage medium. The high-speed storage medium is represented by an SSD, and the low-speed storage medium is represented by a hard disk drive (HDD).

A storage architecture includes an all-flash architecture, a mechanical disk architecture, and a hierarchical storage architecture. In the all-flash architecture, only an SSD is allowed for connection, and in the mechanical disk architecture, only a HDD is included. In the hierarchical storage architecture, at a logical storage layer, storage path planning is performed on data that needs to be stored, so that the data can be stored into an SSD or an HDD based on different storage policies. The storage array 40 in this embodiment of this application is a hierarchical storage architecture.

When a hierarchical storage technology is used, to further improve utilization of the storage array 40, a deduplication operation may be performed on to-be-written data. A process of the deduplication operation is as follows. First, when the storage array 40 receives the to-be-written data, the to-be-written data is divided into data blocks with an equal length (for ease of description, a data block included in the to-be-written data is referred to as a "to-be-written data block" below). The length of the data block may be, for example, 4 kilobyte (KB), 8 KB, or 16 KB. Then, a characteristic value of each to-be-written data block, namely, a fingerprint, is calculated, and a set of fingerprints of different data blocks forms a fingerprint list. The fingerprint list further includes a reference count corresponding to each fingerprint and a storage address of a data block represented by the fingerprint. The reference count is used to indicate a quantity of times of using a fingerprint by different to-be-written data. After the fingerprint of the to-be-written data block is calculated, the fingerprint of each to-be-written data block is compared with fingerprints in the fingerprint list. If the fingerprint of the to-be-written data block matches a fingerprint stored in the fingerprint list, it indicates that the to-be-written data block has been stored in a memory. In this case, the to-be-written data block is deleted from the to-be-written data, and a location of the deleted data block in the to-be-written data is pointed to the fingerprint, in the fingerprint list, matching the fingerprint of the deleted data block. Then, a reference count of the fingerprint matching the fingerprint of the deleted data block is increased by one. If the fingerprint of the to-be-written data block does not exist in the fingerprint list, the fingerprint of the to-be-written data block is added to the fingerprint list, and after the to-be-written data block is stored into the memory, a storage address of the to-be-written data block in the memory is recorded into the fingerprint list.

Figure 3A:
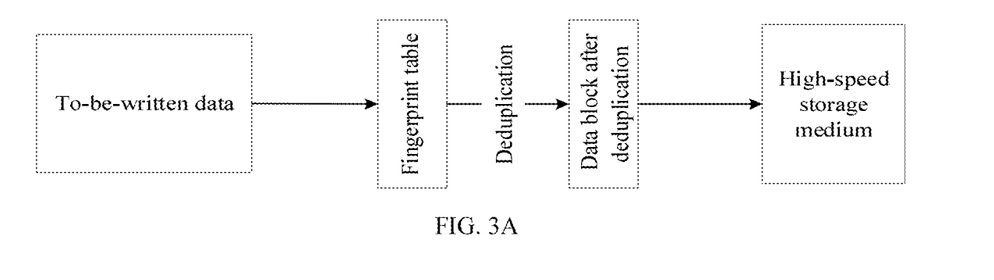
FIG. 3A is a schematic diagram of a foreground deduplication solution based on an all-flash architecture of an embodiment of this application.

Two processing manners may be selected for deduplication. One is foreground deduplication solution based on the all-flash architecture; and the other is background deduplication solution based on the mechanical disk architecture. FIG. 3A is a schematic diagram of a foreground deduplication solution based on an all-flash architecture of an embodiment of this application. In the all-flash architecture, a read-write speed of an SSD is relatively fast. Therefore, a foreground deduplication solution is usually used. As shown in FIG. 3A, when to-be-written data is written to a high-speed storage medium, deduplication is performed on the to-be-written data based on a fingerprint list in an internal storage, and data that has been deduplicated is stored into the high-speed storage medium. This process relates to data deduplication performed before a data block is stored into a physical medium, and therefore is referred to as foreground deduplication.

Figure 3B:
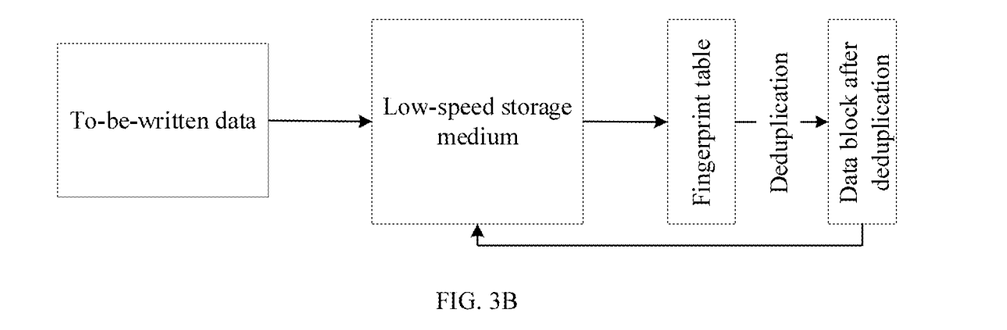
FIG. 3B is a schematic diagram of a background deduplication solution based on a mechanical disk architecture of an embodiment of this application.

FIG. 3B is a schematic diagram of a background deduplication solution based on a mechanical disk architecture of an embodiment of this application. In the mechanical disk architecture, a read-write speed of an HDD is relatively slow. Therefore, background deduplication is used to reduce impact of deduplication on I/O. As shown in FIG. 3B, to-be-written data is first written into a low-speed storage medium, and deduplication is then performed on the written data based on a fingerprint list to delete a data block that is in the written data and is the same as a data block corresponding to a fingerprint in the fingerprint list. This process relates to data deduplication performed after data is stored into a physical medium, and therefore is referred to as background deduplication.

Figure 4:
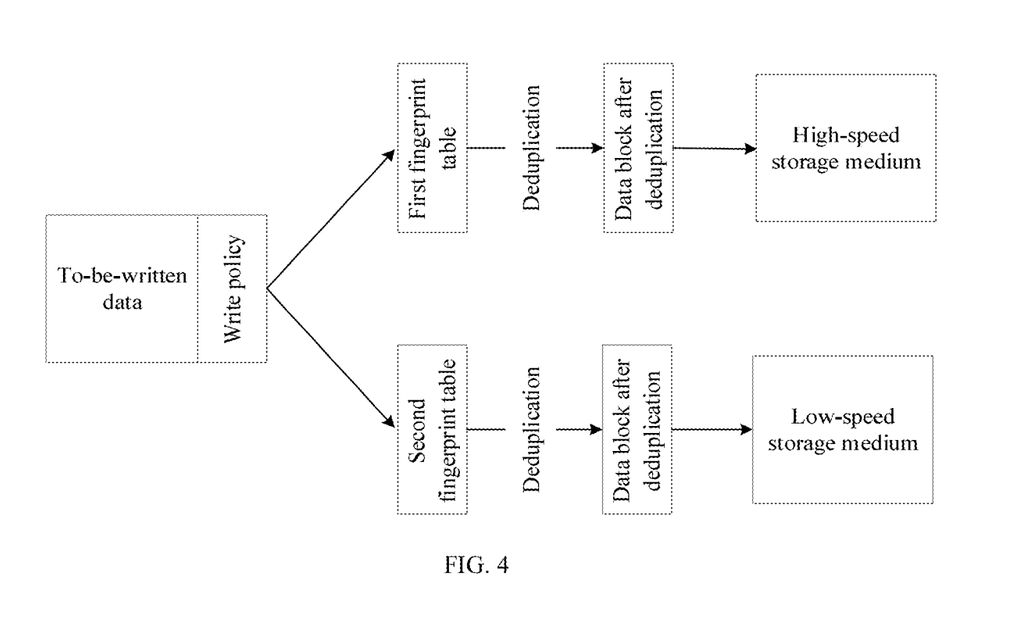
FIG. 4 is a schematic diagram of a hierarchical storage solution of an embodiment of this application.

A storage array in the embodiments of this application includes both an SSD and an HDD. Both the two deduplication technologies can be selected. However, in background deduplication, data is deleted on a background. Therefore, data deletion hysteresis exists. In addition, data that is not deleted is first stored into a physical medium, and therefore an extra storage space is reserved in the physical medium, which leads to a space amplification problem. Furthermore, data deduplication after the data is written into the physical medium will inevitably lead to additional disk read-write operations, which will eventually reduce a disk service life. Therefore, in consideration of the performance advantage of the SSD and the disadvantage of background deduplication, the foreground deduplication technology is selected for hierarchical storage in the embodiments of this application. FIG. 4 is a schematic diagram of a hierarchical storage solution of an embodiment of this application. FIG. 4 shows a hierarchical storage method based on a foreground deduplication technology. A storage medium includes a high-speed storage medium and a low-speed storage medium. To-be-written data is stored into the high-speed storage medium or the low-speed storage medium based on a write configuration policy. However, this hierarchical storage method still has a problem. The high-speed storage medium and the low-speed storage medium each store one fingerprint list, and the two fingerprint lists cannot interact with each other. When different to-be-written files are separately written into the high-speed storage medium and the low-speed storage medium based on the write configuration policy, different to-be-written data may include a same data block. Because the same data block is stored in both the high-speed storage medium and the low-speed storage medium, repeated storage of the data block is caused. This undoubtedly reduces storage efficiency and increases storage space consumption.

Figure 5:
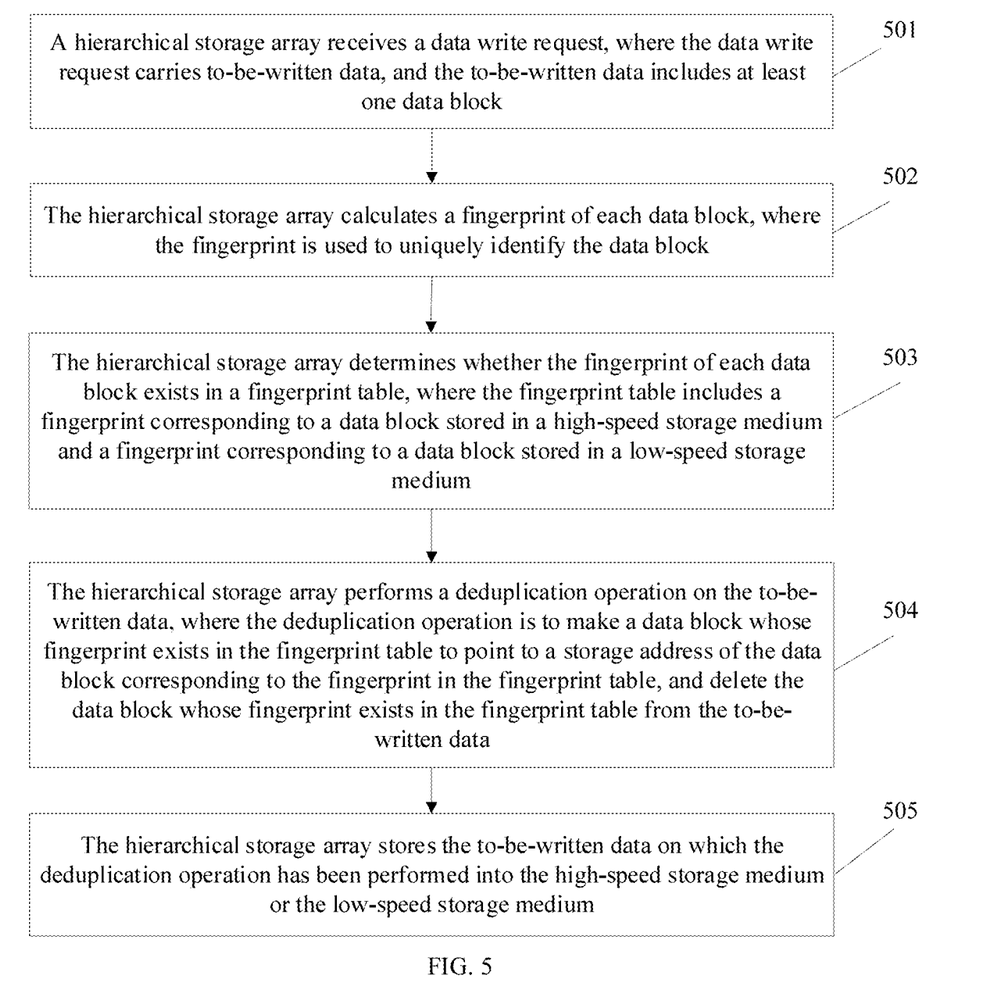
FIG. 5 is a schematic flowchart of a data storage method of an embodiment of this application.

Based on the foregoing problem, FIG. 5 is a schematic flowchart of a data storage method of an embodiment of this application. The method is applied to the storage array shown in FIG. 2, where the storage array includes a high-speed storage medium and a low-speed storage medium. As shown in FIG. 5, the method includes the following steps.

501. The storage array receives a data write request, where the data write request carries to-be-written data, and the to-be-written data includes at least one data block.

The storage array receives a data write request submitted by an application server, and then obtains, through parsing, to-be-written data carried in the write request, where the to-be-written data includes one or more data blocks. Different to-be-written data received by the storage array is written into a plurality of logical block addresses (LBAs) in a logical unit number (LUN), or written into addresses indicated by a multi-level file directory in a file system generated by a network attached storage (NAS). The storage array determines, based on a write configuration policy corresponding to these logical storage spaces, whether that data stored therein is to be stored into the high-speed storage medium or the low-speed storage medium. The write configuration policy may be determined based on a write frequency of the LBA. A higher write frequency of the LBA indicates a greater quantity of modification times of the LBA. Data stored therein is frequently-modified data. When the write frequency is greater than a preset frequency, to ensure a high-frequency write performance requirement, the data in the LBA is determined to be stored into the high-speed storage medium. Alternatively, the write configuration policy may be determined based on a file attribute in the file system. For example, if the file attribute is "archived file", the data may be stored into the low-speed storage medium.

502. The storage array calculates a fingerprint of each data block, where the fingerprint is used to uniquely identify the data block.

It can be learned from the foregoing description that the fingerprint of each data block is used to uniquely identify the data block. Therefore, the fingerprint of the data block may be a hash value obtained by performing a hash value operation on the data block, or a fingerprint obtained by performing calculation on data in the data block in a manner of word counting, probability distribution statistics, or average number calculation, and the like.

503. The storage array determines whether the fingerprint of each data block exists in a fingerprint list, where the fingerprint list includes a fingerprint corresponding to a data block stored in the high-speed storage medium and a fingerprint corresponding to a data block stored in the low-speed storage medium.

Before the data block in the to-be-written data is stored into a physical storage medium, a deduplication operation needs to be performed on the data block, so as to reduce storage space consumption caused by repeated storage of a same data block. As described above, during deduplication, the fingerprint of the data block in the to-be-written data is compared with existing fingerprints in the fingerprint list, to determine whether the fingerprint of the data block exists in the fingerprint list.

Figure 6:
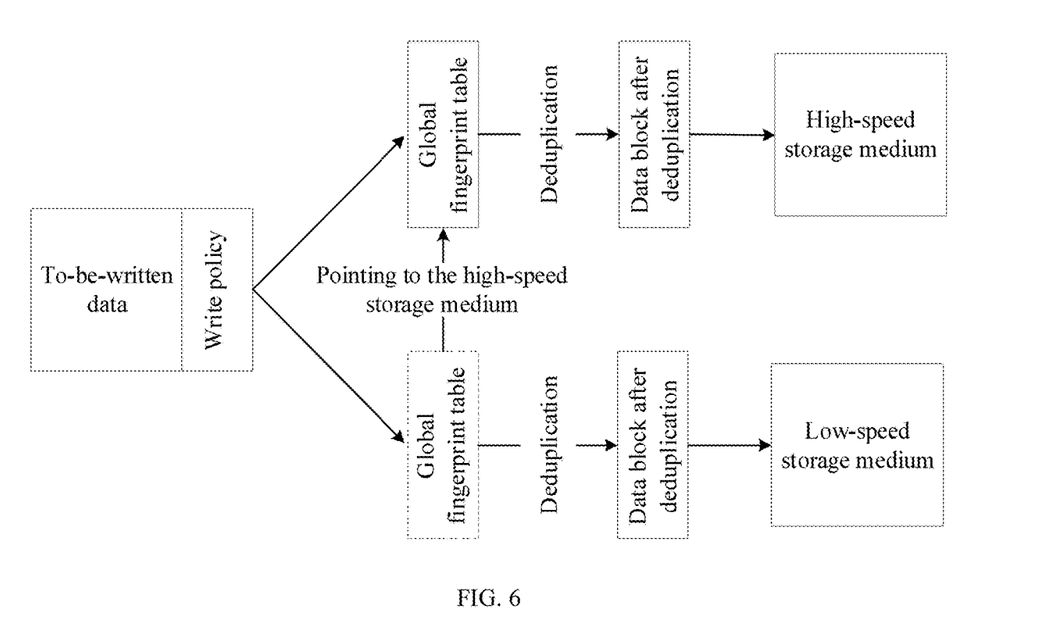
FIG. 6 is a schematic diagram of a data storage process of an embodiment of this application.

The fingerprint lists are respectively generated in the high-speed storage medium and the low-speed storage medium in FIG. 4. Differently, FIG. 6 is a schematic diagram of a data storage process of an embodiment of this application. As shown in FIG. 6, the fingerprint list generated in this embodiment of this application is a global fingerprint list. The global fingerprint list includes fingerprints corresponding to all data blocks stored in the high-speed storage medium and the low-speed storage medium. When deduplication is performed on the data block in the to-be-written data, fingerprint matching is performed between the data block and the global fingerprint list, so as to determine whether the data block in the to-be-written data has been stored into the high-speed storage medium or the low-speed storage medium.

Optionally, the global fingerprint list is stored in the high-speed storage medium. In this way, when a processor reads the fingerprint list to an internal storage, high efficiency and a low latency can be ensured, thereby improving data storage efficiency.

504. Perform a deduplication operation on the to-be-written data, where the deduplication operation is to make a data block whose fingerprint exists in the fingerprint list to point to a storage address of the data block corresponding to the fingerprint in the fingerprint list, and delete the data block whose fingerprint exists in the fingerprint list from the to-be-written data.

Figure 7:
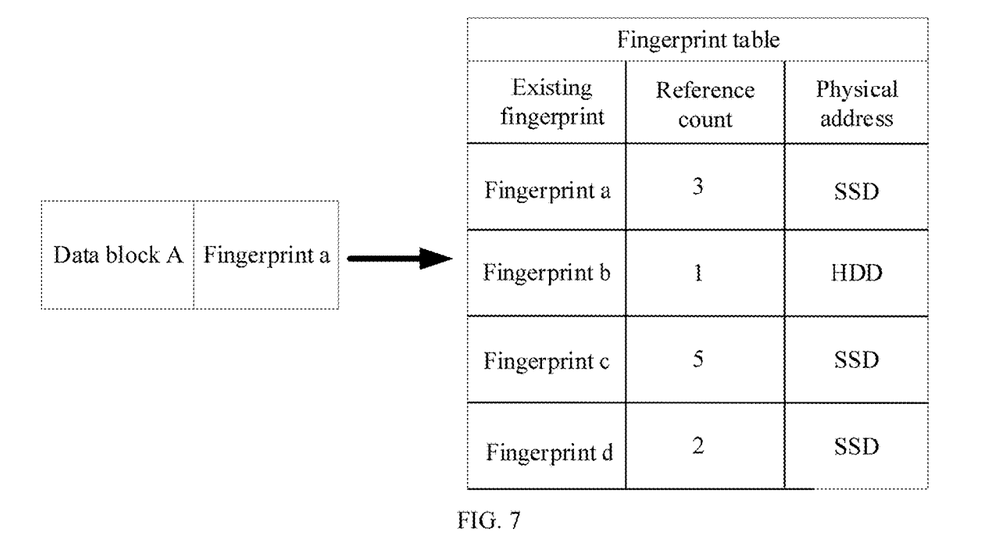
FIG. 7 is a schematic diagram of a fingerprint list matching process of an embodiment of this application.

In an example, FIG. 7 is a schematic diagram of a fingerprint list matching process of an embodiment of this application. As shown in FIG. 7, the global fingerprint list is a data list that includes a plurality of existing fingerprints corresponding to data blocks stored in a physical storage medium. Matching is performed between the fingerprint of the data block in the to-be-written data and the existing fingerprints in the list sequentially. There are two matching results. An existing fingerprint in the fingerprint list is the same as the fingerprint of the data block, or the existing fingerprints in the fingerprint list are different from the fingerprint of the data block.

When matching is performed between the fingerprint of the data block and the existing fingerprints in the global fingerprint list, if the global fingerprint list has an existing fingerprint same as the fingerprint of the data block, it indicates that the data block corresponding to the fingerprint has been stored in the high-speed storage medium or the low-speed storage medium. The data block does not need to be stored again. Therefore, the data block is deleted from the to-be-written data. On the contrary, if the global fingerprint list does not have an existing fingerprint same as the fingerprint of the data block, it indicates that the data block corresponding to the fingerprint has not been stored in the high-speed storage medium or the low-speed storage medium. Therefore, the data block needs to be reserved for subsequent storage in the physical storage medium.

In addition, the global fingerprint list further includes a storage address of the data block corresponding to the fingerprint in addition to the fingerprint corresponding to the data block stored in the physical storage medium, where the storage address is a storage address of the data block corresponding to the fingerprint in the high-speed storage medium or the low-speed storage medium. In this embodiment of this application, the storage address may be an SSD or an HDD. The global fingerprint list further includes a reference count corresponding to a fingerprint, and the reference count is used to record a quantity of times that the fingerprint is used for data block deduplication. When the fingerprint is recorded into the fingerprint list for the first time, the reference count is 1. Subsequently, each time the fingerprint is used for one deduplication operation, the reference count is progressively increased by one. For example, a fingerprint a corresponds to a data block A. When the data block is stored into a storage medium, the fingerprint a is added to the global fingerprint list, and a reference count corresponding to the fingerprint a is recorded as 1. When to-be-written data ABC is subsequently received, because a fingerprint of the data block A is the same as the fingerprint a in the fingerprint list, the fingerprint a is used to perform a deduplication operation on the to-be-written data, that is, the data block A in the to-be-written data is deleted, and the data block A in the to-be-written data is pointed to a physical address corresponding to the fingerprint a in the fingerprint list by using a pointer. For example, ①BC, where ① is the pointer corresponding to the fingerprint a. In addition, the reference count of the fingerprint a is progressively increased to 2. Similarly, when to-be-written data AEF is subsequently received, the to-be-written data AEF is 1①EF after deduplication is performed on the to-be-written data AEF by using the fingerprint a, and the reference count of the fingerprint a is progressively increased to 3.

505. Store the to-be-written data on which the deduplication operation has been performed into the high-speed storage medium or the low-speed storage medium.

After the to-be-written data is deduplicated, the to-be-written data on which the deduplication operation has been performed includes a plurality of data blocks obtained after deduplication. The data blocks obtained after deduplication are determined to be written into the high-speed storage medium or the low-speed storage medium based on the foregoing write configuration policy, to complete a data block storage process.

Alternatively, before the to-be-written data is stored into the physical medium, the data block in the to-be-written data may be further compressed by using a data compression technology, and then a compressed data block is stored into the physical medium. Data compression is to eliminate redundant information from original data by using a compression algorithm such as LZ4 to save a storage space. Data deduplication and data compression can be used together. Deduplication followed by compression can minimize a data-occupied space.

It can be learned that, in this embodiment of this application, the global fingerprint list is generated, so that the data blocks stored in the high-speed storage medium and the low-speed storage medium share the same fingerprint list to perform the data deduplication operation, thereby avoiding repeatedly generating a fingerprint for a same data block in different storage media, avoiding repeatedly storing the data block in different storage media, and thus improving storage efficiency and saving a storage space.

Figure 8:
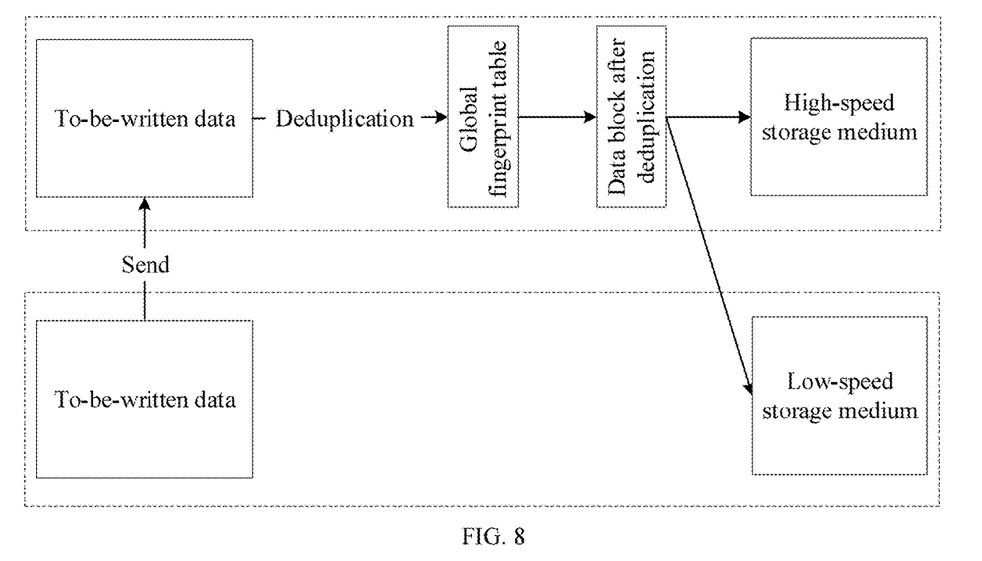
FIG. 8 is a schematic diagram of a cross-system storage architecture of an embodiment of this application.

In addition, in a possible case, the high-speed storage medium and the low-speed storage medium may exist in different storage systems or storage arrays, but two storage systems and storage arrays are connected to each other. FIG. 8 is a schematic diagram of a cross-system storage architecture of an embodiment of this application. As shown in FIG. 8, a high-speed storage medium and a low-speed storage medium are in two different independent systems. Similarly, to reduce problems of low deduplication efficiency and repeated storage because when fingerprint lists are generated in different storage systems or storage arrays, fingerprints are generated for a same data block in two fingerprint lists, a global fingerprint list may be generated in one of the storage systems or the storage arrays. All to-be-written data in the other storage system or storage array is sent to the storage system or the storage array that includes the global fingerprint list for data deduplication. In this way, a data block obtained after deduplication is obtained. Finally, the data block obtained after deduplication is sent back to the corresponding storage system or storage array.

To improve deduplication efficiency, the global fingerprint may be generated in the high-speed storage medium. The global fingerprint list is used to perform deduplication on to-be-written data in the high-speed storage medium for storage, and to-be-written data in the low-speed storage medium is sent to the high-speed storage medium for deduplication. Then, a data block obtained after deduplication corresponding to the to-be-written data in the low-speed storage medium is sent back to the low-speed storage medium for storage. This embodiment can effectively improve efficiency of deduplication and storage in storage media across systems.

Figure 9:
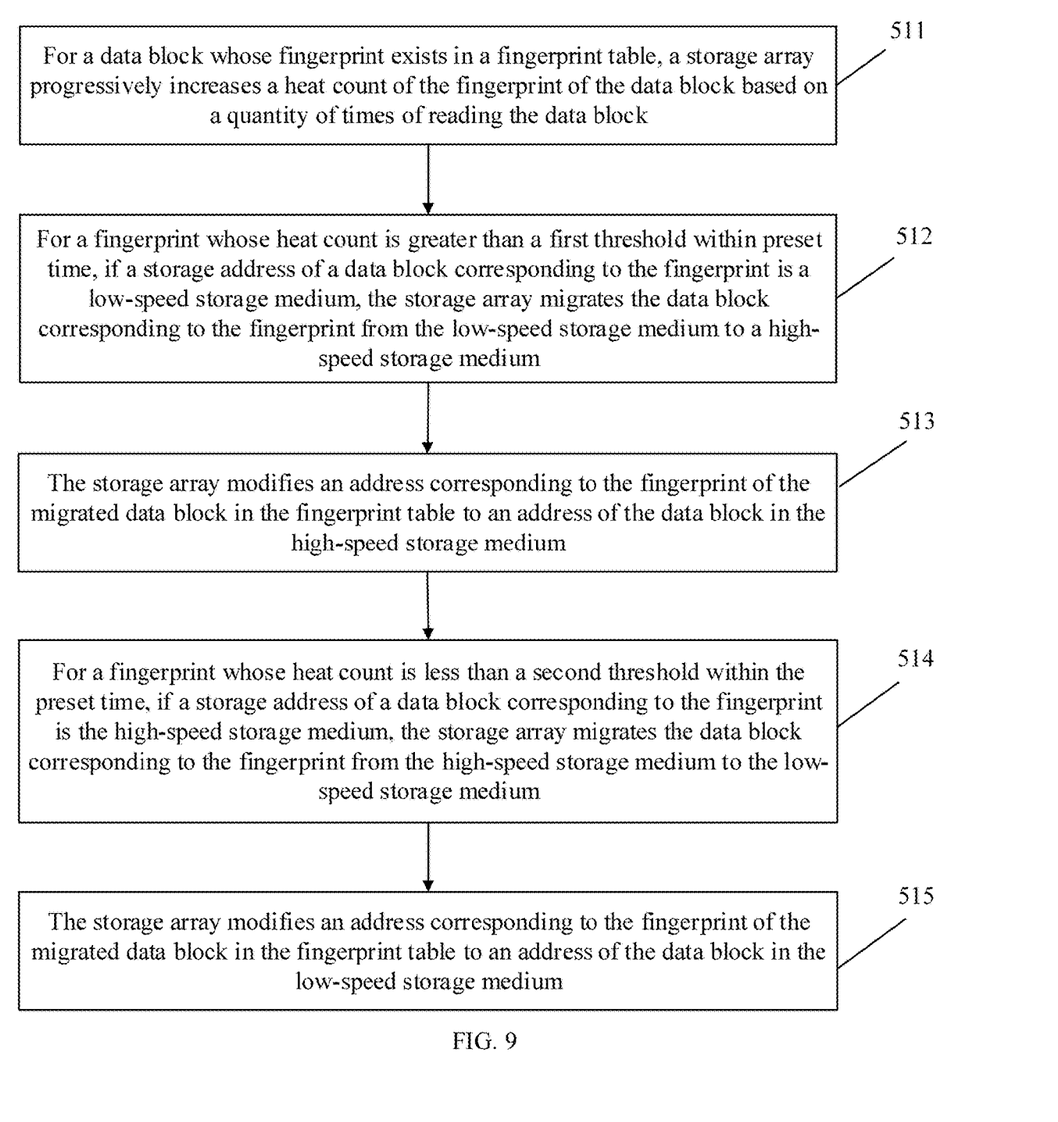
FIG. 9 is a schematic process diagram of a data migration method of an embodiment of this application.

FIG. 9 is a schematic process diagram of a data migration method of an embodiment of this application. As shown in FIG. 9, after data deduplication and storage are performed by using the global fingerprint list, data migration may be further performed. The method includes the following steps.

511. For the data block whose fingerprint exists in the fingerprint list, the storage array progressively increases a heat count of the fingerprint of the data block based on a quantity of times of reading the data block.

512. For a fingerprint whose heat count is greater than a first threshold within preset time, if a storage address of a data block corresponding to the fingerprint is the low-speed storage medium, the storage array migrates the data block corresponding to the fingerprint from the low-speed storage medium to the high-speed storage medium.

513. The storage array modifies an address corresponding to the fingerprint of the migrated data block in the fingerprint list to an address of the data block in the high-speed storage medium.

514. For a fingerprint whose heat count is less than a second threshold within the preset time, if a storage address of a data block corresponding to the fingerprint is the high-speed storage medium, the storage array migrates the data block corresponding to the fingerprint from the high-speed storage medium to the low-speed storage medium.

515. The storage array modifies an address corresponding to the fingerprint of the migrated data block in the fingerprint list to an address of the data block in the low-speed storage medium.

After the to-be-written data is stored into the high-speed storage medium and the low-speed storage medium based on the foregoing steps 501 to 505, the data block continues to be read for use, and a heat count value is progressively increased based on a quantity of times of reading the data block. Further, the data block may be classified into cold data and hot data based on a heat count result, where the cold data is a data block that has a heat count result less than a preset value, and the hot data is a data block that has a heat count result greater than or equal to the preset value. Correspondingly, the hot data should be stored into the high-speed storage medium to meet a requirement of high-speed access. The cold data may be stored into the low-speed storage medium to reduce storage pressure of the high-speed storage medium.

Currently, for a file storage system and an object storage system, data is stored at a granularity of a file or an object, and data statistics are also collected at a granularity of a file or an object. However, generally, a file or an object is relatively large. Therefore, when being stored into a storage medium, the file or the object needs to be divided into a plurality of data blocks for deduplication. In this case, data obtained after deduplication may point to a plurality of fingerprints. When heat of one file or one object changes, for example, from cold data to hot data, the file or the object needs to be migrated to the high-speed storage medium. However, a fingerprint of the file or the object may further point to other cold data. Therefore, when the file or the object is migrated, the deduplicated file needs to be restored. In addition, if the file or the object has been compressed before being stored, decompression needs to be performed first. After the file or the object is restored, the restored file or object is migrated to the high-speed storage medium, and before the file or the object is stored into the high-speed storage medium, deduplication and compression need to be performed again. In this way, deduplication and compression need to be performed for a plurality of times, and consume a computing resource. In addition, after data migration, data originally stored only in the low-speed storage medium needs to be stored into both the high-speed medium and the low-speed medium. As a result, a storage space is amplified.

Figure 10:
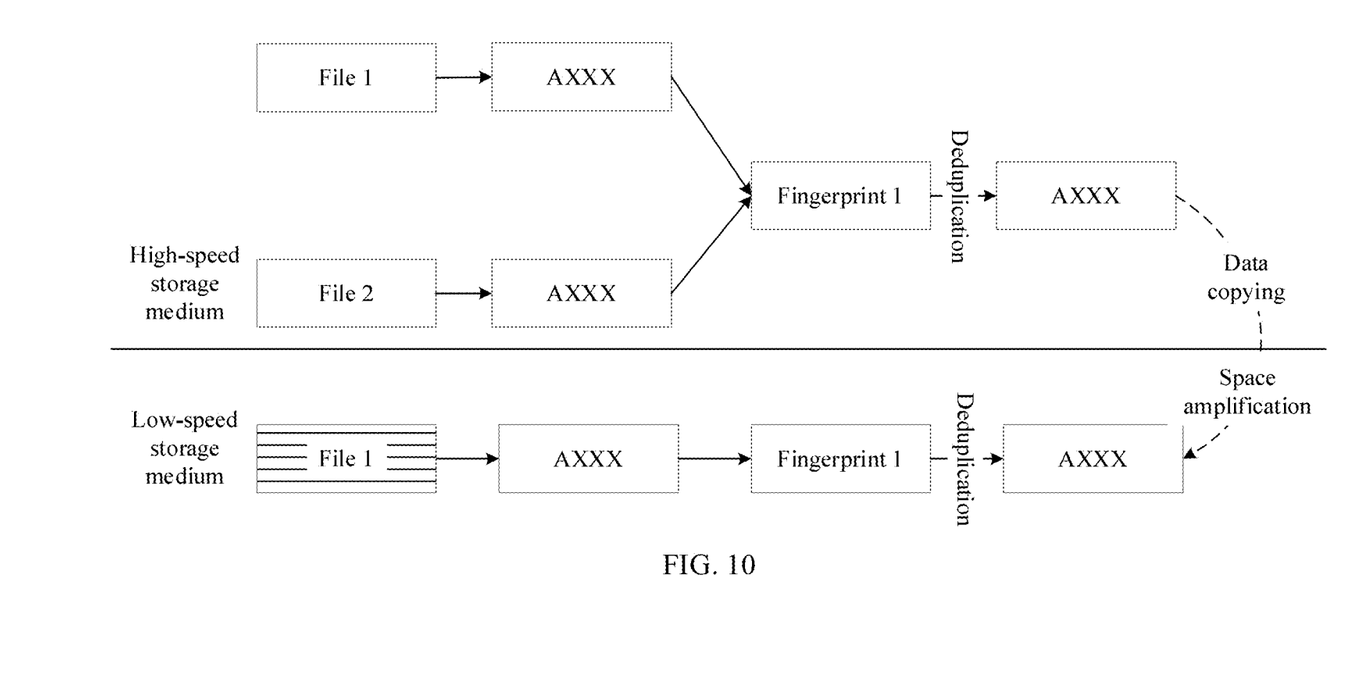
FIG. 10 is a schematic diagram of a data migration process of an embodiment of this application.

FIG. 10 is a schematic diagram of a data migration process according to an embodiment of this application. As shown in FIG. 10, there are two pieces of to-be-written data, which are respectively a file 1 and a file 2. It is assumed that the file 1 includes a data block AXXX, and the file 2 also includes a data block AXXX. When the file 1 and the file 2 are stored, it is determined based on a write configuration policy that the high-speed storage medium is a storage medium corresponding to both the file 1 and the file 2. When deduplication is performed on the file 1 by using the fingerprint list in the high-speed storage medium, matching is performed between a fingerprint of the data block AXXX in the file 1 and the fingerprint list. If the fingerprint list does not have an existing fingerprint that matches the fingerprint of AXXX, the fingerprint of AXXX is written into the fingerprint list. In addition, AXXX is stored into the high-speed storage medium. If an existing fingerprint 1 in the fingerprint list successfully matches the fingerprint of AXXX, it indicates that AXXX has been stored in the high-speed storage medium. AXXX in the file 1 is deleted, and a reference count of the fingerprint 1 is increased by 1. Similarly, when deduplication is performed on the file 2 by using the fingerprint list in the high-speed storage medium, because AXXX has been stored in the high-speed storage medium, AXXX in the file 2 is deleted, and the reference count of the fingerprint 1 corresponding to AXXX is increased by 1. As such, the file 1 and the file 2 are stored. Then, after heat statistics are collected on the file 1 for a period of time, data in the file 1 is determined as cold data. However, data in the file 2 is still hot data. In this case, the data corresponding to the file 1 needs to be migrated from the high-speed storage medium to the low-speed storage medium. When the file 1 is migrated, the file 1 first needs to be restored, that is, data 1 that is used for storage after the file 1 is deduplicated is restored to the file 1. If the data 1 is compressed data, decompression further needs to be performed, where the data 1 includes a plurality of data blocks. Then, the restored file 1 is copied to the low-speed storage medium, and when the file 1 is stored into the low-speed storage medium, data deduplication needs to be performed on the file 1 by using a fingerprint list stored in the low-speed storage medium. After it is determined that the fingerprint list in the low-speed storage medium does not include the fingerprint corresponding to AXXX, AXXX needs to be stored into the low-speed storage medium. In this way, only one copy of the data AXXX that is originally included in the two files needs to be stored into the high-speed storage medium before migration. However, after the file 1 is migrated to the low-speed storage medium, the data AXXX needs to be stored into both the high-speed storage medium and the low-speed storage medium, thereby causing space amplification. In addition, after the file 1 is migrated to the low-speed storage medium, deduplication further needs to be performed once, which affects migration efficiency.

In this embodiment of this application, on a premise that the global fingerprint list is used, heat counting is performed on a fingerprint in the fingerprint list, that is, heat counting is performed on a fingerprint corresponding to a data block corresponding to a fingerprint in the fingerprint list based on a quantity of times of reading the data block. When a heat count of a fingerprint within the preset time is greater than the first threshold, a data block corresponding to the fingerprint is determined as hot data; or when a heat count of a fingerprint within the preset time is less than the second threshold, the data corresponding to the fingerprint is determined as cold data, where the first threshold≥the second threshold. When the first threshold is equal to the second threshold, it indicates that the data block has only two states, e.g., hot data or cold data. When the first threshold is greater than the second threshold, it indicates that the data block may be hot data or cold data, or may be in an intermediate state. When the data block is in the intermediate state, a current storage location of the data block is maintained, and the data block is not to be migrated.

In this process, a data block is determined as cold data or hot data by using a heat count result of a fingerprint in the fingerprint list. Each fingerprint in a same fingerprint list is unique, and therefore a heat count result of the fingerprint is also unique. A data block corresponding to the fingerprint also has only one state, which is hot data, cold data, or intermediate state data. Therefore, the data block is stored in only one storage medium, thereby avoiding space amplification caused by repeated storage of a same data block in both the high-speed storage medium and the low-speed storage medium. Similarly, the high-speed storage medium and the low-speed storage medium share the same global fingerprint list, so that deduplication does not need to be performed for a plurality of times in a data migration process. After a data block is migrated, a physical address corresponding to a fingerprint is modified without modifying the fingerprint list and a reference count, thereby improving migration efficiency.

In addition, if a data block stored into the physical storage medium is a compressed data block, in a conventional data migration process, after heat statistics are collected on a file or object basis, if it is determined that a file needs to be migrated, compressed data blocks need to be decompressed and restored to an original file, and then the original file is migrated. After migration is complete, the original file is compressed for storage. This process uses repeated decompression and compression, resulting in low migration efficiency.

In this embodiment of this application, based on a heat count of a fingerprint in the global fingerprint list, a data block corresponding to the fingerprint is determined as hot data or cold data, then a compressed data block stored in the physical storage medium is located based on the fingerprint, and the compressed data block is directly migrated. Repeated decompression and re-compression do not need to be performed on the data block, thereby further improving migration efficiency.

It can be learned that, in this embodiment of this application, heat counting is performed on a fingerprint in the global fingerprint list, and whether to migrate a data block corresponding to the fingerprint is determined based on a heat count result, thereby effectively avoiding the space amplification problem caused by repeated storage of a same data block, further effectively avoiding redundant deduplication, compression, and decompression operations during repeated storage, and thus improving data migration efficiency.

Figure 11A:
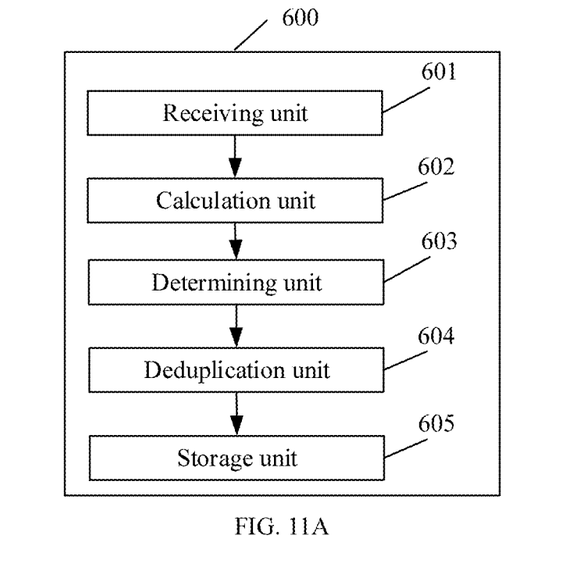
FIG. 11A is a schematic structural diagram of a data storage apparatus of an embodiment of this application.

FIG. 11A is a schematic structural diagram of a data storage apparatus of an embodiment of this application. The storage apparatus includes a high-speed storage medium and a low-speed storage medium. Referring to FIG. 11A, an apparatus 600 includes a receiving unit 601 configured to receive a data write request, where the data write request carries to-be-written data, and the to-be-written data includes at least one data block; a calculation unit 602 configured to calculate a fingerprint of each data block, where the fingerprint is used to uniquely identify the data block; a determining unit 603 configured to determine whether the fingerprint of each data block exists in a fingerprint list, where the fingerprint list includes a fingerprint corresponding to a data block stored in the high-speed storage medium and a fingerprint corresponding to a data block stored in the low-speed storage medium; a deduplication unit 604 configured to perform a deduplication operation on the to-be-written data, where the deduplication operation is to make a data block whose fingerprint exists in the fingerprint list to point to a storage address of the data block corresponding to the fingerprint in the fingerprint list, and delete the data block whose fingerprint exists in the fingerprint list from the to-be-written data; and a storage unit 605 configured to store the to-be-written data on which the deduplication operation has been performed into the high-speed storage medium or the low-speed storage medium.

It can be learned that the apparatus provided in this embodiment of this application generates a global fingerprint list, so that data blocks stored in the high-speed storage medium and the low-speed storage medium share the same fingerprint list to perform a data deduplication operation, thereby avoiding repeatedly generating a fingerprint for a same data block in different storage media, avoiding repeatedly storing the data block in different storage media, and thus improving storage efficiency and saving a storage space.

In an optional example, the determining unit 603 is further configured to add, to the fingerprint list, a fingerprint of a data block in the to-be-written data that does not exist in the fingerprint list; and after the to-be-written data on which the deduplication operation has been performed is stored into the high-speed storage medium or the low-speed storage medium, add, to the fingerprint list, a storage address of the data block that is in the to-be-written data and whose fingerprint does not exist in the fingerprint list.

Figure 11B:
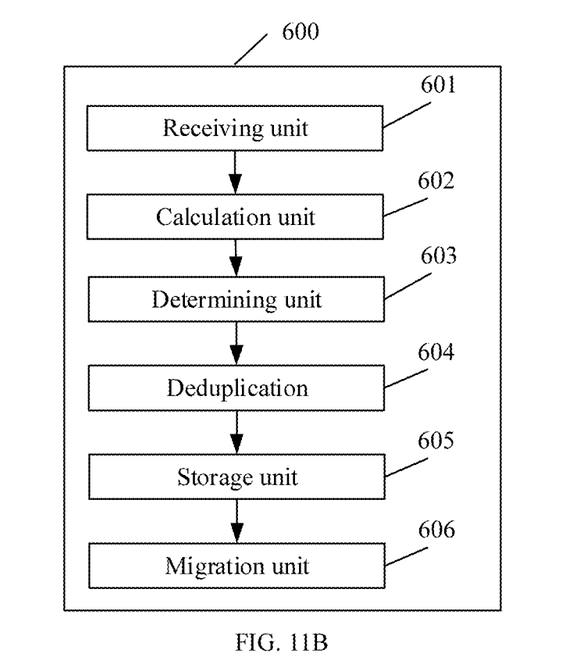
FIG. 11B is a schematic structural diagram of another data storage apparatus of an embodiment of this application.

In an optional example, FIG. 11B is a schematic structural diagram of another data storage apparatus. The apparatus 600 further includes a migration unit 606 configured to, for the data block whose fingerprint exists in the fingerprint list, progressively increase a heat count of the fingerprint of the data block based on a quantity of times of reading the data block; for a fingerprint whose heat count is greater than a first threshold, if a storage address of a data block corresponding to the fingerprint is the low-speed storage medium, migrate the data block corresponding to the fingerprint from the low-speed storage medium to the high-speed storage medium; and modify an address corresponding to the fingerprint of the migrated data block in the fingerprint list to an address of the data block in the high-speed storage medium.

In an optional example, the migration unit 606 is further configured to, for a fingerprint whose heat count is less than a second threshold, if a storage address of a data block corresponding to the fingerprint is the high-speed storage medium, migrate the data block corresponding to the fingerprint from the high-speed storage medium to the low-speed storage medium; and modify an address corresponding to the fingerprint of the migrated data block in the fingerprint list to an address of the data block in the low-speed storage medium.

In an optional example, the fingerprint list is stored in the high-speed storage medium.

It should be noted that the foregoing units (the receiving unit 601, the calculation unit 602, the determining unit 603, the deduplication unit 604, the storage unit 605, and the migration unit 606) are configured to perform related steps of the foregoing methods.

In this embodiment, the apparatus 600 is presented in a form of a unit. The "unit" herein may refer to an application-specific integrated circuit (ASIC), a processor that executes one or more software or firmware programs and a memory, an integrated logic circuit, and/or another device that can provide the foregoing functions. In addition, the receiving unit 601, the calculation unit 602, the determining unit 603, the deduplication unit 604, the storage unit 605, and the migration unit 606 may be implemented by using a processor 701 of an apparatus 700 shown in FIG. 12.

Figure 12:
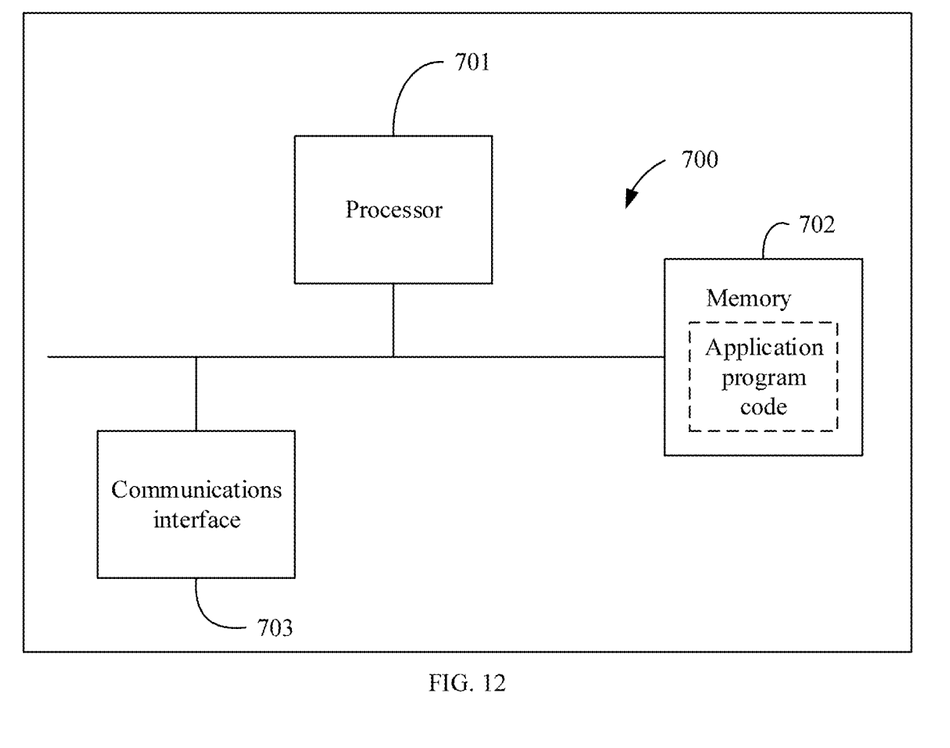
FIG. 12 is a schematic structural diagram of an apparatus of an embodiment of this application.

As shown in FIG. 12, the apparatus 700 may be implemented by using the structure in FIG. 12. The apparatus 700 includes at least one processor 701, at least one memory 702, and at least one communications interface 703. The processor 701, the memory 702, and the communications interface 703 are connected and communicate with each other by using the communications bus.

The processor 701 may be a general-purpose CPU, a microprocessor, an ASIC, or one or more integrated circuits configured to control execution of the foregoing solution programs.

The communications interface 703 may be configured to communicate with another device or a communications network, for example, Ethernet, a radio access network (RAN), or a wireless local area network (WLAN).

The memory 702 may be a read-only memory (ROM) or another type of static storage device that can store static information and instructions, a random-access memory (RAM) or another type of dynamic storage device that can store information and instructions, and may also be an electrically erasable programmable read-only memory (EE-PROM), a compact disc read-only memory (CD-ROM) or another compact disc storage and optical disc storage (including a compact disc, a laser disc, an optical disk, a digital versatile disc, a Blu-ray disc, and the like), a disk storage medium or another magnetic storage device, or any other medium capable of being configured to carry or store desired program code that is in the form of instructions or a data structure and capable of being accessed by a computer, but not limited thereto. The memory may exist independently and is connected to the processor by using a bus. Alternatively, the memory may be integrated with the processor.

The memory 702 is configured to store application program code for executing the foregoing solutions, and the processor 701 controls execution. The processor 701 is configured to execute the application program code stored in the memory 702.

The code stored in the memory 702 may perform the data storage method performed by the foregoing data storage apparatus, for example, receiving a data write request, and determining a target storage medium corresponding to written data based on the data write request and a data write configuration policy; performing a fingerprint obtaining operation on the written data on a data block basis, to determine a fingerprint corresponding to the data block, where the fingerprint is used to uniquely identify the data block; matching the fingerprint with an existing fingerprint in a global fingerprint list, where the global fingerprint list is stored in a high-speed storage medium; performing data deduplication on the data block based on a matching result, to obtain a data block after deduplication; and storing the data block obtained after deduplication into the target storage medium.

An embodiment of this application further provides a computer storage medium. The computer storage medium may store a program, and when the program is executed, some or all of the steps of any data transmission rate adjustment method described in the foregoing method embodiments are included.

It should be noted that, for brief description, the foregoing method embodiments are represented as a series of actions. However, a person skilled in the art should know that this application is not limited to the described order of the actions, because of this application, some steps may be performed in other orders or simultaneously. It should be further known by a person skilled in the art that the embodiments described in this specification all belong to embodiments, and the involved actions and modules are not required by this application.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The computer software product is stored in a memory and includes several instructions for instructing a computer device (which may be a personal computer, a server, a network device, or the like) to perform all or some of the steps of the methods described in the embodiments of this application. The foregoing memory includes any medium that can store program code, such as a Universal Serial Bus (USB) flash drive, a ROM, a RAM, a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a ROM, a RAM, a magnetic disk, and an optical disc.

The embodiments of this application are described in detail above. The principle and implementations of this application are described through specific examples in this specification. The description about the embodiments is merely provided to help understand the method and core ideas of this application. In addition, a person of ordinary skill in the art can make variations and modifications to this application in terms of the specific implementations and application scopes of the ideas of this application. Therefore, the content of specification shall not be construed as a limit to this application.

What is claimed is:

1. A data storage method, comprising:
receiving, by a storage apparatus, a data write request that carries to-be-written data, wherein the to-be-written data comprise a first data block;
calculating, by the storage apparatus, a first fingerprint of the first data block uniquely identifying the first data block;
determining, by the storage apparatus, whether the first fingerprint is in a fingerprint list, wherein the fingerprint list comprises at least one fingerprint corresponding to at least one data block stored in a high-speed storage medium and at least one fingerprint corresponding to at least one data block stored in a low-speed storage medium;
performing, by the storage apparatus, a deduplication operation on the to-be-written data, wherein the deduplication operation comprises:
making a second data block whose second fingerprint is in the fingerprint list point to a first storage address of the first data block; and
deleting the first data block from the to-be-written data to obtain deduplicated to-be-written data; and
writing, by the storage apparatus, the deduplicated to-be-written data into the high-speed storage medium or the low-speed storage medium.

2. The data storage method of claim 1, further comprising:
adding, to the fingerprint list, a second fingerprint of a second data block in the to-be-written data, wherein the second fingerprint does not exist in the fingerprint list; and
adding, to the fingerprint list, a storage address of the second data block after storing the to-be-written data into the high-speed storage medium or the low-speed storage medium.

3. The data storage method of claim 2, further comprising:
progressively increasing a heat count of the first fingerprint based on a quantity of times of reading the first data block;
for a second fingerprint whose heat count is greater than a first threshold within a preset time, migrating the second data block corresponding to the second fingerprint from the low-speed storage medium to the high-speed storage medium to obtain a migrated data block when a storage address of the second data block corresponding to the second fingerprint is the low-speed storage medium; and
modifying an address corresponding to the second fingerprint of the migrated data block in the fingerprint list to the address of the data block in the high-speed storage medium.

4. The data storage method of claim 1, further comprising:
progressively increasing a heat count of the first fingerprint based on a quantity of times of reading the first data block;
for a second fingerprint whose heat count is greater than a first threshold within a preset time, migrating a second data block corresponding to the second fingerprint from the low-speed storage medium to the high-speed storage medium to obtain a migrated data block when a storage address of the second data block corresponding to the second fingerprint is the low-speed storage medium; and
modifying an address corresponding to the second fingerprint of the migrated data block in the fingerprint list to the address of the second data block in the high-speed storage medium.

5. The data storage method of claim 4, further comprising:
for a fifth fingerprint whose heat count is less than a second threshold within the preset time, migrating a fifth data block corresponding to the fifth fingerprint from the high-speed storage medium to the low-speed storage medium to obtain a migrated data block when a storage address of the fifth data block corresponding to the fifth fingerprint is the high-speed storage medium; and
modifying an address corresponding to the fifth fingerprint of the migrated data block in the fingerprint list to an address of the fifth data block in the low-speed storage medium.

6. The data storage method of claim 1, further comprising storing the fingerprint list in the high-speed storage medium.

7. The data storage method of claim 1, further comprising creating the fingerprint list, comprising the first fingerprint and the second fingerprint.

8. The data storage method of claim 1, wherein the storage apparatus further comprises the high-speed storage medium and the low-speed storage medium.

9. The data storage method of claim 1, further comprising communicating with the high-speed storage medium and the low-speed storage medium.

10. The data storage method of claim 1, wherein the storage apparatus is a storage array.

11. An apparatus, comprising:
a memory configured to store program instructions;
a processor coupled to the memory and configured to execute the program instructions, that when executed by the processor, cause the apparatus to be configured to:
receive a data write request that carries to-be-written data, wherein the to-be-written data comprise a first data block;
calculate a first fingerprint of the first data block uniquely identifying the first data block;
determine whether the first fingerprint is in a fingerprint list, wherein the fingerprint list comprises at least one fingerprint corresponding to at least one data block stored in a high-speed storage medium and at least one fingerprint corresponding to at least one data block stored in a low-speed storage medium;
perform a deduplication operation on the to-be-written data, wherein the deduplication operation comprises:
making a second data block whose second fingerprint is in the fingerprint list point to a storage address of the first data block; and
deleting the first data block from the to-be-written data to obtain deduplicated to-be-written data; and
write the deduplicated to-be-written data into the high-speed storage medium or the low-speed storage medium.

12. The apparatus of claim 11, wherein the program instructions further cause the apparatus to be configured to:
add, to the fingerprint list, a second fingerprint of a second data block in the to-be-written data, wherein the second fingerprint does not exist in the fingerprint list; and
add, to the fingerprint list, a storage address of the second data block after storing the to-be-written data into the high-speed storage medium or the low-speed storage medium.

13. The apparatus of claim 12, wherein the program instructions further cause the apparatus to be configured to:
progressively increase a heat count of the first fingerprint based on a quantity of times of reading the first data block;
for a second fingerprint whose heat count is greater than a first threshold within a preset time, migrate the second data block that corresponds to the second fingerprint from the low-speed storage medium to the high-speed storage medium to obtain a first migrated data block when a storage address of the second data block that corresponds to the second fingerprint is the low-speed storage medium; and
modify an address that corresponds to the second fingerprint of the first migrated data block in the fingerprint list to the address of the data block in the high-speed storage medium.

14. The apparatus of claim 13, wherein the program instructions further cause the apparatus to be configured to:
for a fifth fingerprint whose heat count is less than a second threshold within the preset time, migrate a fifth data block that corresponds to the fifth fingerprint from the high-speed storage medium to the low-speed storage medium to obtain a second migrated data block when a storage address of the fifth data block that corresponds to the fifth fingerprint is the high-speed storage medium; and
modify an address that corresponds to the fifth fingerprint of the second migrated data block in the fingerprint list to an address of the fifth data block in the low-speed storage medium.

15. The apparatus of claim 11, wherein the program instructions further cause the apparatus to be configured to:
progressively increase a heat count of the first fingerprint based on a quantity of times of reading the first data block;
for a second fingerprint whose heat count is greater than a first threshold within a preset time, migrate a second data block that corresponds to the second fingerprint from the low-speed storage medium to the high-speed storage medium to obtain a migrated data block when a storage address of the second data block that corresponds to the second fingerprint is the low-speed storage medium; and
modify an address that corresponds to the second fingerprint of the migrated data block in the fingerprint list to the address of the second data block in the high-speed storage medium.

16. The apparatus of claim 11, wherein the high-speed storage medium stores the fingerprint list.

17. The apparatus of claim 11, wherein the program instructions further cause the apparatus to be configured to create the fingerprint list comprising the first fingerprint and the second fingerprint.

18. The apparatus of claim 11, wherein the apparatus further comprises the high-speed storage medium and the low-speed storage medium.

19. The apparatus of claim 11, wherein the apparatus is in communication with the high-speed storage medium and the low-speed storage medium.

20. A computer program product comprising computer-executable instructions that are stored on a non-transitory computer readable storage medium and that when executed by a processor of an apparatus, cause the apparatus to:
receive a data write request that carries to-be-written data, wherein the to-be-written data comprises a first data block;
calculate a first fingerprint of the first data block uniquely identifying the first data block;
determine whether the first fingerprint exists in a fingerprint list, wherein the fingerprint list comprises at least one fingerprint corresponding to at least one data block stored in a high-speed storage medium and at least one fingerprint corresponding to at least one data block stored in a low-speed storage medium;

perform a deduplication operation on the to-be-written data, wherein the deduplication operation comprises:

making a second data block whose second fingerprint is in the fingerprint list that points to a first storage address of the first data block; and deleting the first data block from the to-be-written data to obtain deduplicated to-be-written data; and write the deduplicated to-be-written data into the high-speed storage medium or the low-speed storage medium.

* * * * *